United States Patent
Waly

[15] 3,704,068
[45] Nov. 28, 1972

[54] MICRO-IMAGE RECORDING AND READ-OUT SYSTEM

[72] Inventor: Adnan Waly, Stamford, Conn.

[73] Assignee: Personal Communications Inc., Stamford, Conn.

[22] Filed: April 21, 1971

[21] Appl. No.: 135,996

[52] U.S. Cl. ............355/46, 350/131, 350/167, 352/81, 353/25, 353/27, 353/30, 355/54
[58] Field of Search ............352/81; 353/25, 27, 30; 350/131, 167; 355/46, 54; 95/18

[56] References Cited

UNITED STATES PATENTS

| | | | |
|---|---|---|---|
| 3,580,675 | 5/1971 | Hieber et al. | 355/50 |
| 3,592,542 | 7/1971 | Käufer | 355/51 X |
| 3,609,035 | 9/1971 | Ataka | 355/40 |
| 3,611,899 | 10/1971 | Ataka | 95/18 R |
| 3,084,453 | 4/1963 | Brown | 350/167 X |
| 3,459,111 | 8/1969 | Cooper, Jr. | 350/167 UX |

*Primary Examiner*—Samuel S. Matthews
*Assistant Examiner*—Richard A. Wintercorn
*Attorney*—Michael Ebert

[57] ABSTRACT

A microimage technique for recording information such as the pages of a book, in a reduced scale on a film surface, and for reproducing the microimages of the pages in an enlarged scale by means of an optical reader whose overall dimensions are comparable to those of an ordinary book. The pages of the book are recorded as multiple microimages on the film surface of a micro-record in an interlaced fashion, whereby the characters constituting each page are interspersed with the characters of the other pages. The reader is provided with a lens matrix constituted by a planar array of lensettes having short focal lengths, each of which is adapted to enlarge a respective individual character in the group of characters forming the text of a microimage representing a single page. The reader includes means to index the multiple-image microrecord relative to the matrix whereby successive microimages are presented on a screen parallel to the matrix. The screen dimensions are comparable to those of an original page. The optical throw or distance between the lens matrix and the screen is extremely short, whereby the depth of the reader may be as small as one inch.

29 Claims, 10 Drawing Figures

PATENTED NOV 28 1972
3,704,068
SHEET 1 OF 3
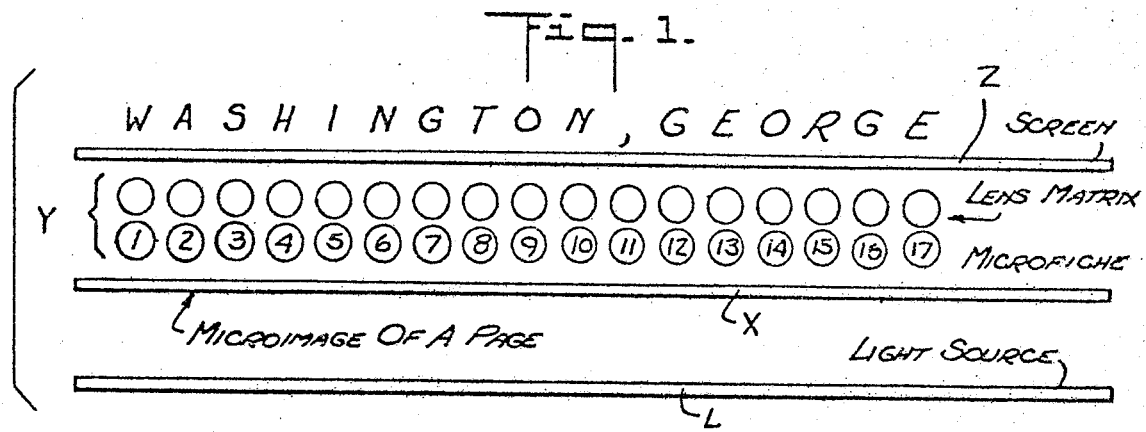
Fig. 1.
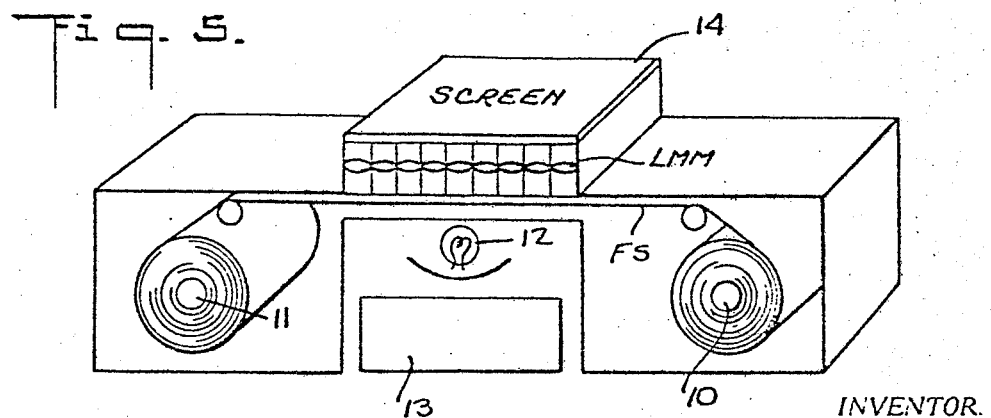
Fig. 2.
Fig. 5.
INVENTOR.
ADNAN WALY
BY
ATTORNEY

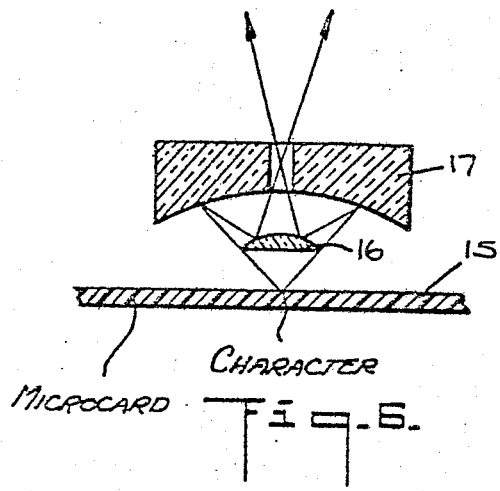
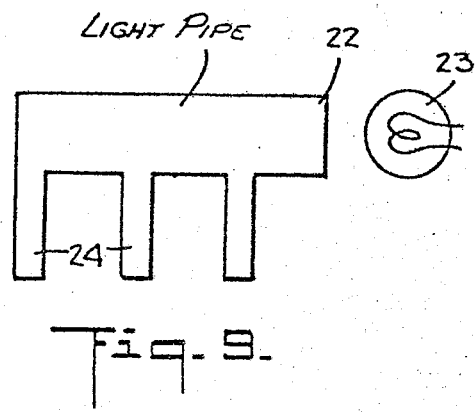
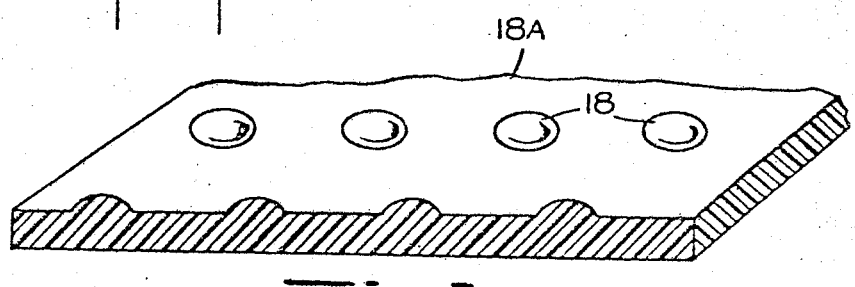
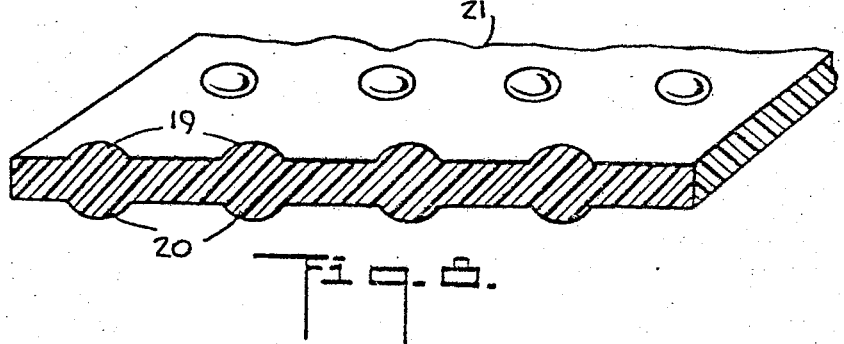
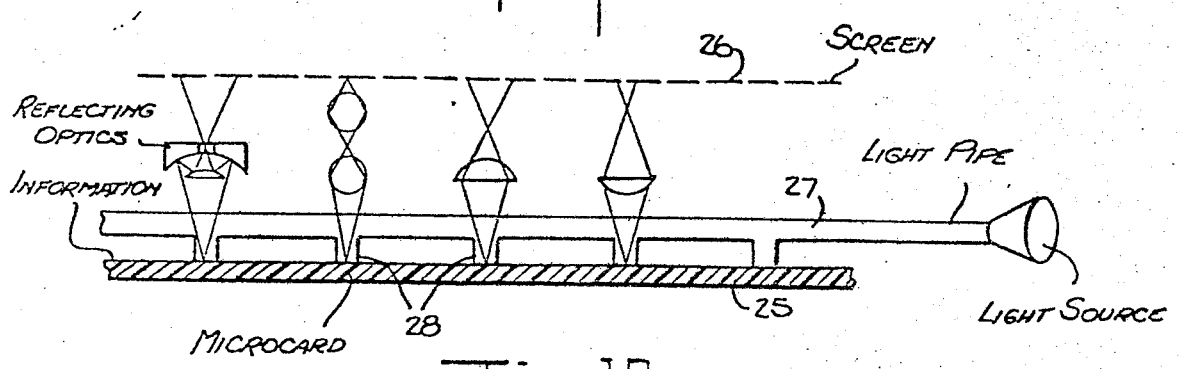

MICRO-IMAGE RECORDING AND READ-OUT SYSTEM

BACKGROUND OF THE INVENTION

This invention relates generally to micro-image techniques for recording and reproducing intelligence, and more particularly to a microfilm system in which specially prepared, interlaced microimages appearing on a multiple-image microrecord may be read back by a highly compact optical reader.

In order to conserve storage space and afford a ready means for retrieving information, it is now common practice to photograph documents, records, books and various forms of technical data in a sharply reduced scale on microfilm. Conventionally, a microscale image of each book page or document is recorded on a separate frame on a microfilm roll. To view the recorded data, the roll is inserted in a reader or optical projector and the film is advanced therein to place a selected frame into the optical gate whereby an enlarged and readable image is cast on a screen.

In recent years, a new technique has been developed to place a group of microfilm images on a single sheet rather than along a film roll. In such sheets, which are known commercially as "microfiches," the microscale images are generally arranged serially along parallel rows, whereby the microimages are distributed in a grid formation on the sheet. A microfiche is useful where one wishes to incorporate on a single reproducible sheet, interrelated documents or other information pertaining to a particular subject matter. Thus, with a microfiche, one may record all of the pages of a sizeable book on a single sheet.

An original microfiche is known as a master. The principal advantage of a microfiche master, apart from the fact that it provides a consolidated record, is that it is readily reproducible to form additional or reference copies. The most effective way of deriving transparent reference copies from a microfiche master is by the contact printing process, the microfiche master serving as the negative.

By using modern microfiche techniques, one is able, from a single microfiche master containing all of the pages of a book, to produce thousands of low-cost reference copies. It becomes possible, therefore, at a modest cost, to supply a student with a small file containing, say, 500 microfiches, each being a complete record of a reference book. In this way, an engineering student may be provided with a complete library of 500 engineering texts at a very small fraction of the cost of these books.

In order, however, to make use of the microfiche, the student requires an optical reader. This reader must include means to shift the microfiche in the X and Y directions, in order to align a particular frame with the optical system serving to project an enlarged image of the selected frame or page on the screen.

Existing forms of microfilm and microfiche readers, even those of very simple and relatively compact design, have a certain minimum volume which precludes their use in the same manner as a book. A typical book is about 8 inches wide, 10 inches long and 1½ inches in depth. A book of this or somewhat larger size may be carried about and read without difficulty, for the book dimensions lend themselves to personal handling.

But though a microfilm roll, a microfilm cartridge or a microfiche makes it possible to highly compress the information contained on hundreds or thousands of pages, the conventional reader adapted to reproduce the images carried on the film strip or microfiche has a substantial volume, so that even the smallest commercially available reader cannot be carried about or handled in the manner of a book.

In order to understand why existing reader designs dictate a relatively large minimum volume that precludes dimensions comparable to those of a book, we shall consider by way of example a microfiche containing 2,160 frames, each frame being a microimage of a book page, whose dimensions are 8 ½ x 11 inches, with several thousand characters appearing on each page. For proper read-out without eyestrain, a frame magnification of about 60 times is required. Obviously, the larger the magnification, the greater the acuity in viewing or reading of the micro-recorded material.

However, practical considerations impose strict limits on the degree of magnification which is feasible. Let us assume that the projection system must be adapted x blow-up the microimage from a size of 0.168 to 0.130 inches, to a size equal to or larger than the original of 8 ½ x 11 inches. Since lens systems are generally round, the lens must be capable of accommodating the larger diagonal of the 8 ½ x 11 inch page without distortion.

This projector requires a lens of large aperture (small $f$-number) and large field acceptance angle. In order to present enlarged letters in acceptable form with only a negligible degree of distortion at the corners of the page, the lens must be highly corrected. Such lenses are expensive and run as high as $150 or more.

The $f$-number has to be small, if one considers that all light appearing on the screen must pass through the very small microimage frame. The smaller the $f$-number, the less wasteful is the lens in optical terms, but the more expensive it becomes. A severe limit on the amount of permissable light is set by the fact that the microfiche may be damaged by absorbed light flux. If the light intensity is increased to improve the readability of the image, the resultant increase in absorbed light flux may be destructive to the film.

A typical commercial reader lens suitable for existing microfiche images may have as many as 12 elements and a length of 3.7 inches, with a focal length of 6.2 mm and a diameter of about 1.2 inches. A lens of this type is suitable for only a small field of about 11° and requires a projection distance of at least 40 inches.

It is for the foregoing reasons that conventional microfilm or microfiche readers must have a minimum light path of 12 to 40 inches for acceptable performance. Such readers, therefore, usually make use of beam-folding arrangements in order to create a relatively compact reader box whose dimensions make it feasible to place the reader on a table or pedestal. But with existing microfilm and microfiche techniques, however ingeniously the optical reader is designed, one cannot, because of minimum light path requirements, reduce the reader dimensions to a point where the overall dimensions are comparable to those of a book, that is a reader in shallow box form whose length and width, determined by screen size, more or less correspond to those of a book page, and with a box depth no greater than about 2 inches.

SUMMARY OF THE INVENTION

In view of the foregoing, it is the main object of this invention to provide a microimage technique in which the pages or documents to be recorded in microfilm or microfiche form are not recorded in discrete frames, but are interlaced on a common surface to produce a multiple image micro-record which may be read back by selectively enlarging only those characters or bits of information on the surface, which together constitute the information contained on a single page or document.

More specifically, it is an object of this invention to provide a multiple-image microfilm or microfiche of the above-described type, which may be read back by an optical reader whose dimensions are comparable to those of an ordinary book, which reader may be carried about and used in the manner of a book. Thus with a reader in accordance with the invention, the reader may be held in the lap of the user and does not require a supporting table or stand.

Also an object of the invention is to provide a microimage system making use of a multiple-image, interlaced micro-record which is readable by means of a reader having a lens matrix constituted by a planar array of lensettes, each functioning to enlarge a respective individual character in the group of characters forming the text of a single microimage, means being included selectively to index the multiple-image micro-record relative to the matrix, whereby with each incremental shift a new image derived from the multiple microimage is presented.

A significant feature of the invention resides in the fact that because each lensette is called upon to enlarge only a single character rather than an entire microimage, as in conventional readers, the lensette need have only a very narrow angle of field and need not be corrected for aberrations. Since the entire matrix may be inexpensively molded, the cost of the reader, which is determined in large part by the lens system, is exceptionally low as compared to standard readers. Moreover, because each lensette serves to project a single character onto the screen in a short throw, the total depth of the reader may be as small as 1 inch or even less, thereby making possible a flat or shallow-box reader structure whose dimensions are comparable to those of an ordinary book.

Also an object of the invention is to provide a micro-record in which the pages of recorded text appears in interlaced form on a common surface, and which may be fully read back in a reader by incrementally advancing the micro-record in one direction only, thereby obviating the need to shift the record in both the X and Y directions to derive all of the recorded material.

Briefly stated, these objects are attained in a system in which the pages of a book or a series of documents or other data are recorded in a reduced scale on the surface of a recording film to produce multiple microimages thereon, the micro-images representing the pages or documents being interlaced, whereby the characters or information bits which together constitute the text of one page or document, are interspersed with those representing the characters or bits constituting the text of the other pages or documents.

While the invention as described herein, breaks down the text of each page into individual characters or bits, it is to be understood that where the text in question is constituted by a drawing, a photograph or other information not in symbolic or character form, this text will be analyzed into separate bits, each of which will be picked up by a related lensette in the matrix.

The multiple image micro-record is reproduced by means of an optical reader having a lens matrix defined by a planar array of lensettes, each of which is arranged to enlarge and project a respective individual character or bit in the group thereof forming a distinct microimage, the enlarged images formed by the lensettes being projected over a short distance onto a screen parallel to the matrix.

Means are provided to index the micro-record relative to the matrix whereby with each incremental shift, a different group of characters or bits are caused to register with the matrix, thereby successively presenting the individual images of the multiple image micro-record on said screen. While a screen is disclosed, it is to be understood that with an appropriate matrix design, one may view the image directly on the matrix, each lensette defining one element in a mosaic of characters or bits, which together create the microimage.

OUTLINE OF THE DRAWINGS

For a better understanding of the invention, as well as further objects and further features thereof, reference is made to the detailed description to be read in conjunction with the accompanying drawings, wherein:

FIG. 1 schematically shows a microrecord image projection system illustrative of certain principles underlying the invention;

FIG. 2 illustrates in plan view an interlaced multiple-image microrecord in accordance with the invention;

FIG. 3 shows another embodiment of a microrecord in accordance with the invention, which microrecord lends itself to indexing in only one direction;

FIG. 4 is a modification of the microrecord shown in FIG. 3;

FIG. 5 is a cassette-type reader adapted to present a microrecord of the type shown in FIG. 4;

FIG. 6 is a schematic diagram of a lens for projecting a character appearing on a microrecord;

FIG. 7 shows one form of lens matrix;

FIG. 8 shows another form of lens matrix;

FIG. 9 is one form of a multiple-branch light pipe for illuminating a character pattern; and FIG. 10 is another embodiment of a light pipe.

DESCRIPTION OF THE INVENTION

General Principles

In a micro-record in accordance with the invention, the characters or bits of information constituting the text or subject matter of a single page or document to be recorded, are interlaced with the characters or bits of information constituting the text or subject matter of the many other pages or documents recorded on the same micro-record.

If, therefore, we assume that each page has a maximum character or bit capacity of 1,000, the 1,000 characters or bits representing each page or document, will be so distributed and spaced from each other on the micro-record as to form a particular character pattern thereon, whose position is distinct from the character patterns representing all other pages or documents recorded on the same micro-record.

The lens matrix which cooperates with the multiple-microimage record or micro-record is formed by a planar array of lensettes having short focal lengths, the lensettes being distributed and so spaced from each other on the matrix as to optically register with the respective characters in that character pattern on the micro-record which is disposed in alignment with the matrix.

Hence by indexing the micro-record relative to the lens matrix, one may bring the various character patterns representing individual pages and documents into sequential alignment with the matrix, and thereby project the text thereof to the viewer, one page at a time. Assuming a simple indexing mechanism operated by pressing a button or pushing a lever, and a reader in flat form, one may then read a micro-record of a book very much in the fashion of a book, with the reader held in the hands of the user.

But before considering in detail the nature of the micro-record having interlaced character patterns, and the structure of the reader for projecting this unique micro-record, we shall, in connection with FIG. 1, first analyze in highly simplified form, a microfiche projection arrangement illustrative of certain principles underlying the present invention.

The transparent microfiche is designated by the letter X, the lens matrix therefor is designated by Y, and the screen onto which the characters are projected, is designated by Z. Illumination of the microfiche is provided by a suitable light source L. On the microfiche, there appears a single line of text, composed of seventeen characters spelling "WASHINGTON, GEORGE."

The lens matrix consists in the example, of 17 lensettes numbered 1 to 17, the lensettes being linearly spaced and in optical registration with the 17 characters on the microfiche parallel to the matrix. Thus lensette number "1" projects character W on the screen, lensette number "11" projects character "," on the screen, and lensette 17 projects character E on the screen.

Each lensette may be in the form of a small (i.e., 2 mm) acrylic plastic bead. A bead of this size is incapable of projecting a whole micro-page of say, 0.168 × 0.130 inches, except very imperfectly, for serious pin cushion distortion would be encountered and only a central portion of the page would be readable, even if the lens were carefully focused.

However when a lens of this tiny size, which is herein termed a "lensette" is used only to project a single character rather than a whole page, no disturbing distortion of the projected character is experienced even with a very cheaply molded lensette.

If now a second such acrylic bead is used in tandem in order effectively to form a compound projection microscope, one may project each character without any significant distortion over a distance of smaller than 2 inches between the microfiche surface and the screen.

The pair of lenses, which in the drawing is represented by two distinct spheres, one above the other, may in practice be constituted by half spheres or smaller segments, or by connected lenses of the microscope objective type. Or an inverted telephoto objective type with small focal length, may be used. In any event, the distance between the micro-record and the screen is very short, thereby making possible a shallow-box or flat reader.

The observer views the screen in the usual way at normal viewing distance. Screen Z may be a conventional projection screen, but improved viewing is achievable with a directional screen, that is a screen with pronounced forward scatter, or having a fresnel-type lens placed above or below the screen.

Thus with the characters on the microfiche in alignment with the axes of the lens system, and with the magnification and apertures such that each lensette exclusively shows a respective character on the screen, one is able to read the full line of characters without distortion.

This novel technique for recording and organizing information so that characters are projected by individual lensettes, is highly efficient, for the whole microfiche or film can be filled completely with characters or bits of information, provided that these bits are recorded in an interlaced manner as previously described.

Micro-Records

Referring now to FIG. 2, there is shown a microfiche or micro-record R on which, to simplify the example, only 25 pages of text or documentation are recorded in the form of interlaced character patterns.

All of the various characters such as the letters of the alphabet, which together constitute the text of page one, are represented in the Figure by the number "1." It will be seen that the numbers "1" are distributed over the record and are spaced from each other to create a character pattern having a generally rectangular formation. The numbers "1" in the character pattern all lie in optical registration with an array of lensettes in a lens matrix M. The lens are represented by circles which enclose the numbers "1." Hence the lensette pattern corresponds to the pattern of characters recorded in the record R.

It will also be seen that the total number of "1's" in the character pattern in nine, there being three lines with three "1's" in each line. Obviously, this is a gross simplification, for in actual practice, the maximum number of characters per page may be well over a thousand characters or bits of information.

The characters which together constitute the text of the second page are represented by numbers "2," those representing the text of page three by the numbers "3," and so on until we reach page 25, represented by numbers "25." Each pattern of numbers occupies an interlaced position determined by its column and row setting which is distinct from every other pattern. Consequently by selectively indexing the record R relative to lens matrix M, each character pattern may be brought into exact alignment with the matrix for separate projection and readout.

In the interlaced pattern shown in FIG. 2, the arrangement is such as to permit indexing in the X and Y directions to effect a total read-out of all 25 patterns. To illustrate how this action takes place, we have identified the first five columns on the micro-record by letters $A_c$, $B_c$, $C_c$, $D_c$, and $E_c$ and the first five rows by the letters $A_r$, $B_r$, $C_r$, $D_r$, and $E_r$.

Hence when record R is so aligned with the matrix M that the lensettes are in registration with the successive column and row settings in the X and Y directions, all 25 pages can be read out one-by-one, in the following order:

| Page Character Pattern | Column | Row |
|---|---|---|
| 1 | $A_r$ | $A_r$ |
| 2 | $B_r$ | $A_r$ |
| 3 | $C_r$ | $A_r$ |
| 4 | $D_r$ | $A_r$ |
| 5 | $E_r$ | $A_r$ |
| 6 | $A_r$ | $B_r$ |
| 7 | $B_r$ | $B_r$ |
| 8 | $C_r$ | $B_r$ |
| 9 | $D_r$ | $B_r$ |
| 10 | $E_r$ | $B_r$ |
| 11 | $A_r$ | $C_r$ |
| 12 | $B_r$ | $C_r$ |
| 13 | $C_r$ | $C_r$ |
| 14 | $D_r$ | $C_r$ |
| 15 | $E_r$ | $C_r$ |
| 16 | $A_r$ | $D_r$ |
| 17 | $B_r$ | $D_r$ |
| 18 | $C_r$ | $D_r$ |
| 19 | $D_r$ | $D_r$ |
| 20 | $E_r$ | $D_r$ |
| 21 | $A_r$ | $E_r$ |
| 22 | $B_r$ | $E_r$ |
| 23 | $C_r$ | $E_r$ |
| 24 | $D_r$ | $E_r$ |
| 25 | $E_r$ | $E_r$ |

Let us now consider the nature of the interlaced pattern micro-record or microfiche in more practical terms.

On a fiche 8 ½ × 11 inches (i.e. of 93.5 square inch area) on which the characters and type require a regular spacing of 1.5 mil × 1.5 mil, $93.5/2.25 \times 10^6$ letters can be nominally located, that is 41.5 million letters. It will be appreciated therefore that the character capacity of the fiche is extraordinarily high.

Since the page content of a typical novel averages 2,200 letters per page, whereas the most densely printed scientific journal contains 5,500 letters per page, we find that if 95 percent of the fiche is utilized, about 18,000 pages of a novel or 7,200 pages of a scientific journal can be stored on a single micro-record of the interlaced type. This means that 90 books of 200 pages each of the novel type or 24 books of 300 pages each of the scientific journal type can be recorded on a single thin fiche of 8 ½ by 11 inches.

One has to choose a letter size on the screen which is an integral multiple of the letter size on the fiche. If, as assumed, the space allocated for the letter in the fiche is 1.5 mil × 1.5 mil, the magnification factor 67 will make the letters on the screen have the size 100.5 mil. This will be the lateral and/or vertical module of the lensette axes of the lens matrix.

Let us consider a line on a fiche 8 ½ inches wide. If these lines are utilized 95 percent, then 8.075 inches are available for information. This line length of 8.075 inches allows for about 80 letters on the screen. Then by shifting the fiche laterally, about 67 different sentences or positions can be read.

The total lateral shift is 67 × 1.5 mil or about 100.5 or about 50 mils in either direction from a center point. The vertical column, if a lens matrix in use can utilize 11 inches at 95 percent utilization = 10.45 inches; hence 10450/100.5 = 104 lensettes. Also here, an up and/or down total movement of 67 is feasible. A total of 104 × 80 = 8320 lensettes is required if a complete matrix is to be used on the fiche for projecting character patterns having an equal number of characters.

Since 67 positions laterally and 67 positions vertically can be used, a total of 4,489 pages or positions can be accommodated, with 8,320 letters visible on each page, or in this particular system 4,489 × 8,320 or a total of 37,348,480 letters can be accommodated.

It will be appreciated that the invention lends itself to other fiche formats and that magnifications of up to 150 and more can be achieved without difficulty. It is possible, for example, to make a reader for a 4 × 6 fiche with a magnification of 150 and that will be ½ to 1 inch in depth or less.

It is also to be understood that the method in accordance with the invention of representing intelligence, is not confined to letters or chemical formula terms, but to any accepted form of symbols, or otherwise encoded information as for instance, holograms, interference patterns, fingerprints, music notes, maps, or portions of pictures and line drawings which in the character pattern on the micro-record constitute the information bits.

In the micro-record embodiment illustrated in FIG. 2, read-out is effected by indexing the micro-record in both the X and Y directions. Hence the reader must be equipped with a mechanism capable of incrementally shifting the record in orthogonal directions relative to the lens matrix. In some instances, it is desirable to effect read-out of the entire record merely by indexing in one direction, for then the indexing mechanism may be simplified and certain advantages may be gained thereby.

Figures 3, 4:
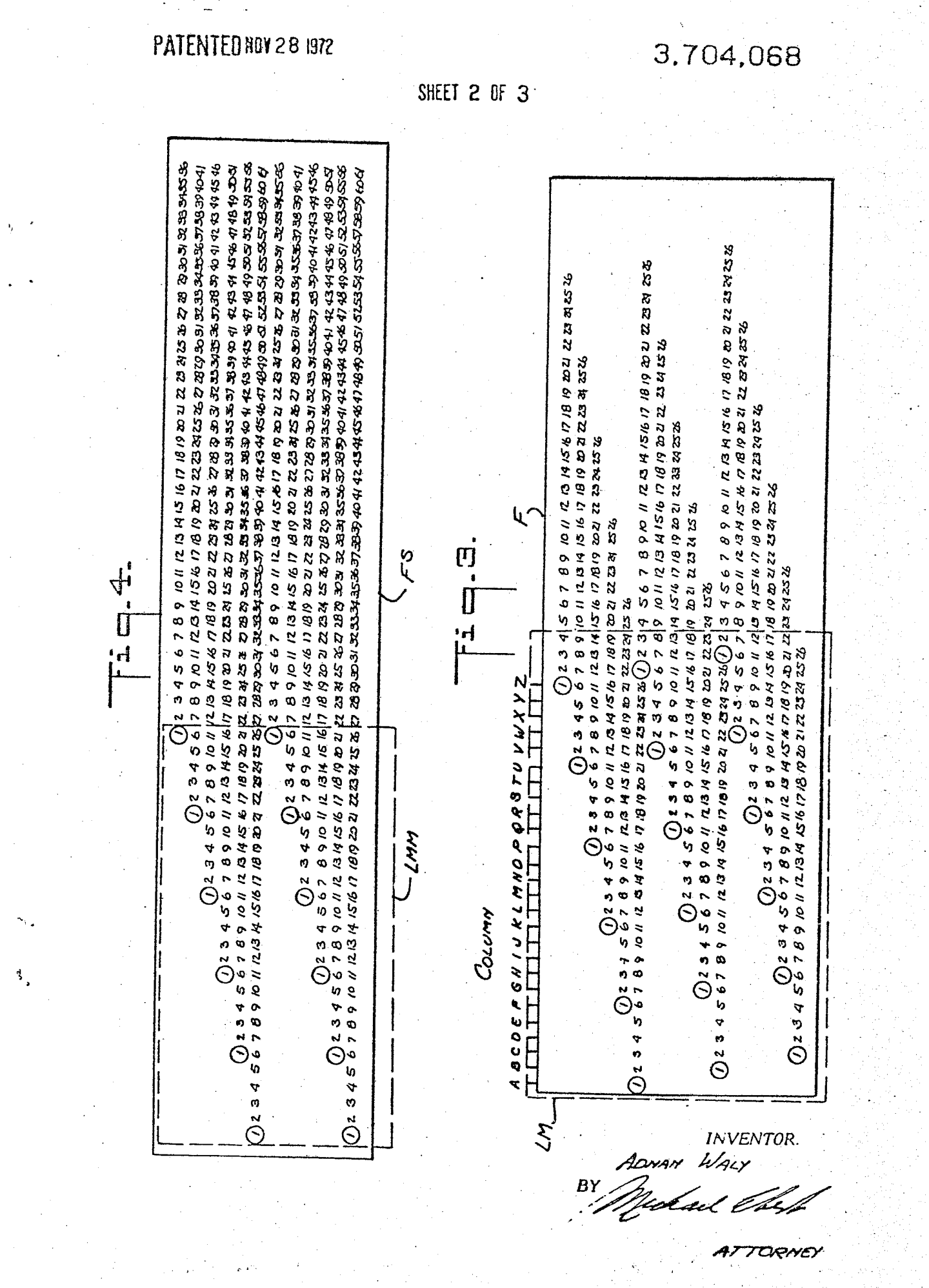

To accomplish this result with a microfiche, the fiche F as shown in FIG. 3, is provided with character patterns which are angled relative to the character lines. In this figure, 26 pages are recorded, the characters of each page being represented by the character patterns containing numbers "1" to "26," respectively. It will be seen that the characters forming each pattern are angled to form character lines which are askew relative to the edges of the fiche.

The lens matrix LM is constituted by an array of lensettes whose positions lie in registration with the characters in a character pattern aligned therewith, and these positions are therefore also askew relative to the edge of the micro-record. In FIG. 3, the lensettes are shown in registration with a character pattern of "1's".

It will be seen that the first series of "1's" in the first six rows in the micro-record are staggered so that the "1" in the sixth row leads the "1" in the fifth row by five character spaces, and the "1" in the fifth row leads that of the fourth row by five character spaces, and so on. The second series of "1's" starts in the sixth row after "26," and is similarly staggered until the eleventh row, where a third series starts after "26."

In this arrangement, because of the staggered relationship of the rows, the effective micro-record area is not fully utilized. However, it has the advantage of permitting a total read-out by indexing in only one direction. Thus as the fiche is shifted incrementally to align columns A to Z with the lens matrix LM, the 26 patterns represented by numbers 1 to 26 will be read out sequentially.

In the interlaced arrangement shown in FIG. 4 which is particularly useful for a film strip FS in casette or cartridge form where indexing can be readily carried out in one direction by conventional film advance mechanisms, the interlacing of the character patterns is also in an askew arrangement, but instead of starting each new series of characters on the last line of the previous series, as in FIG. 3, the new series is begun on the next line. In this way, there are unused spaces on the film strip only on its leading edge, the film record space otherwise being completely used. Here again, we have a lens matrix LMM whose lensettes are in registration with the characters in the character pattern aligned therewith, there being as many lensettes as there are characters in a pattern.

With a micro-record of the type shown in FIG. 4, one may use a casette type of reader as shown in FIG. 5, wherein the film strip FS is wound in a supply roll 10 and is driven past the lens matrix LMM to be rewound on a take-up roll 11. Illumination is provided with a lamp 12 energized by a battery 13, whereby an illuminated and enlarged image is projected on a small screen 14. The indexing in this inexpensive cassette may be carried out manually or by motor-control. One may also use casettes or cartridges with the film in endless belt or continuous form, so that upon completion of indexing, the film may be again read without rewinding.

While in the embodiments previously described, the micro-record or fiche is shown in rectangular or square form, in actual practice round or elliptical records may be used. The characters need not appear in a straight line. For example, with a round fiche, the characters or information bits may be arranged in radial columns, and the lens matrix which is also round, is provided with an array of lensettes whose positions are such as to register with a pattern of characters on the fiche. Or the lensettes may be arranged in a spiral pattern in a manner similar to Nipkov disc to project a character pattern having a spiral formation.

For one special application, the "sentence" length does not, in general, have to exceed 30 characters and the lens matrix can be a linear strip with 30 lensettes. In this instance, illumination is only necessary for the thirty characters lying along the axes of the lensettes, so that battery operation is feasible.

Such a linear lens matrix can be used as a search tool, for instance, with a telephone directory type fiche. In this arrangement, one is primarily interested in locating a given name (subscriber) and his telephone number. Such entries are usually 30 letters per entry and line or column.

The advantages of this arrangement become apparent if one considers the Manhattan telephone directory. It contained in a recent year, 815,000 subscribers and ran 1,890 pages, weighing 5 pounds. According to information supplied by the telephone company, the number of Manhattan directories printed that year was 1.75 million and it took 600 men 4 weeks to distribute the books to the subscribers.

But with the present invention, all entries in the Manhattan directory can be accommodated on a single fiche 8 ½ X 11 inches in size, to be used in conjunction with a search strip of lensettes, yielding one entry at a time. Eye-legible markings in alphabetical order allow the strip to be placed according to the letter or name recorded, while sideways or vertical displacement allows consecutive entries to appear successively in the lens arrangement. A circular fiche which is transparent or of the opaque card variety, can be used with a radial or tangential search strip.

Another variation of the telephone directory recording method is to incorporate a code in the entry together with the name of the subscriber such that this coded message, which may be taking the form of a five-bit code corresponding to the telephone number, may be automatically transferred in electrical terms, when pushing a button, directly onto the touch button or dial telephone system, without introducing a source of errors.

This is achieved by picking up this coded number, with a portion of a lensette projection strip in contact with or adjacent to a photocell sensing strip, producing the electrical impulses serving to "dial" the number. The new AT&T credit card checker and an automatic dialer can be incorporated in such a system. Pickups other than optical are equally feasible.

Another application for the invention is in connection with mail order catalogues, such as that published by Sears-Roebuck, where in this instance, one fiche or micro-record is sufficient to contain all of the catalog information.

In general, one can record information on an omnibus fiche in an encoded way, so that only the person entitled to the information and having the proper lens matrix, can read out selected portions of the information. A large organization, commercial, industrial or educational or governmental, can print an omnibus or multi-purpose fiche containing all information it wishes to record, and then make the master available to individuals whose level of authority determines which portion of the master is readable.

If an individual A is entitled to some information but not all information contained in the multi-purpose fiche, he is provided with a reader having a special lens plate or matrix (A) which can only extract that information which matches his read-out matrix. Hence individual A can read only that information made available to him by his lens plate and nothing else. An individual B is similarly given access only to information encoded to match lens plate B, etc.

But a higher-level person with permission to have access to information groups A to F, for instance, will have a lens plate adapted to extract corresponding information. Another individual may, by way of a special lens matrix, be given access to information groups G to Z. There may, however, be a master lens plate for a senior executive, giving him access to all groups of information. In this way, a security system can be achieved in a rather simple way, entailing the expense of one omnibus fiche from which general issue copies, at agreed intervals, may be distributed to all authorized personnel. Yet only those with the proper readers will be afforded access to the information they have authority to see.

The optical system, in accordance with the invention, in the simple form of lens plates or with special groups of lenses in their proper matrix, can be used to record the material in proper locations on a micro-record by altering the pages of information according to the manner required. Such a system can be used to record a computer output directly in this encoded way, making it possible for persons with appropriate flat-form readers to read-out the information.

Another aspect of this invention resides in its ability to "animate" the recorded information by moving the fiche or filmstrip up and down, or right and left relative to the optical system in any combination desired in order to make the "information" change at an intended rate and sequence.

Optical Systems

The optical systems described are not the only ones that can be used for implementing the invention. In lieu of spherical lenses, an aspherical lens of appropriate diameter can be used for the lensettes. The main emphasis is in short "throwing" distance in the event one uses a screen for viewing and on proper magnification for direct viewing.

Instead of using small radius spherical refracting lenses or crossed cylinder lenses made of glass or plastic, one can make very large-aperture, small reflecting objectives similar to reflecting microscope objectives. Thus as shown in FIG. 6, each character on a microfiche 15 is projected by a lensette system comprising a reflecting spherical surface 16, that reflects the image of the character onto an elliptical concave surface 17 for projection onto a suitable screen. The surface can be corrected elliptically, spherically, or in combinations thereof.

Simple techniques have heretofore been developed in order to manufacture small focal length lens matrices inexpensively by molding them in plastic.

Assuming that spherical lenses are required in tandem, these can be made on thin sheets of a thickness corresponding to the focal length and two of these arranged in tandem. The advantage of the flat thickness having the value of the object distance is that the fiche can be directly contacted with the lens system for automatic focussing etc. Thus as shown in FIG. 7, lensettes 18 in the required pattern are molded on the upper surface of an otherwise flat acrylic plastic sheet 18A having a thickness matching the object distance.

Molds for such a lens matrix can be made for spherical lensettes by embossing copper or other suitable metal blank of the size needed, by means of highly polished, precision ball-bearings at the proper locations. X-Y micro-coder systems are in existence that can advance the holder with the copper blank in accurate steps (to better than 50 microinch), pausing a short moment to emboss the material with the sphere to a prescribed depth until the matrix is complete. This copper blank is now used to mold a plate, say 8½ × 11 or smaller, of acrylic material. If the temperature and the time during the molding are properly held and repeated, predictable expansion coefficients are obtained such that the required tolerances are maintained.

Another method for molding matrices may be that used successfully in multiple mask-making for semiconductor manufacture as described in the article appearing in the IBM Journal of April 1963 entitled, "FLY'S EYE LENS TECHNIQUE FOR GENERATING SEMICONDUCTOR DEVICE FABRICATION MASKS."

A lens plate matrix can be molded with two lenses in tandem if needed, as shown in FIG. 8, such that the alignment of the lensette elements 19 and 20 is automatically molded into the body 21 of the unit. If separate sheets are used, alignment marks, holes, bosses, etc, are provided for this purpose. Lensettes of 1 mm length in tandem with a negative lens of longer focal length, say −3 mm, can yield a magnification of 100 at a distance of 1 inch.

Illumination

We have in the foregoing, only discussed transparent fiches or micro-records which are illuminated from their rear sides. We shall call this mode of operation "back illumination." As will be shown later, the invention is also usable with non-transparent fiches or other sheets or strips which are viewable with "front illumination."

For "back illumination," one can use the conventional means for illuminating the complete fiche with the aid, for instance, of a "light box." Not only is this method wasteful of light, but it also leads to unnecessary heating, and it consumes (when incandescent electric bulbs of any type are used) large amounts of power. This, as a practical matter, precludes battery operation of the reader.

To overcome this drawback, one may use a light-pipe arrangement that conducts light from a common source along multiple paths to positions corresponding to the character positions on the character pattern on the microrecord in registration with the lens matrix. In practice, the light-pipe arrangement may be as shown in FIG. 9, in which a light conductor 22 of suitable plastic or fiber-optics material having internal reflection properties, in optically coupled to a light source 23, and is provided with a multiplicity of light-conducting branches 24 terminating at respective character positions in the pattern.

This arrangement conserves light, for no light is applied onto the fiche except where needed. This makes it feasible to use low-wattage bulbs. Also, because fiberoptics plastics usually filter out infrared energy, and the multiple branches, in any event, effectively dissipate heat, destructive heating of the fiche is avoided. The invention is by no means limited to a single light source, and small bulbs may, in practice, be used in conjunction with clusters of light pipes. Or light-emitting diodes may be used to illuminate the characters.

For non-transparent micro-records, such as record 25 in FIG. 10, to be viewed directly or projected onto a screen 26, a light-pipe structure 27 is used in such a way that the direct path along the axis of the lens system is not impeded. Each reflecting optics lens 28 (similar to that shown in FIG. 6.) therefore "looks" at the opaque record 25 through the back side of the associated branch of the light pipe.

The light pipe in this instance has a main trunk leading to a light source, and multiple branches 28 leading to and terminating in the characters in the character pattern on the micro-record. In this way, no light enters the optical system directly, but only after it scatters reflectively from the front surface of the micro-record. Other schemes are also possible, similar to those used in illuminators for microscopic viewing of metallurgical samples and the like.

Instead of lamps or other sources, the ambient light in the room can be collected and distributed in the manner described in connection with FIG. 10, i.e., the brighter the background illumination, the more light is collected and concentrated where it is needed. This is also applicable to a "back illumination" system.

In regard to the requirements for the indexing mechanism in the reader, it is to be noted that with an interlaced micro-record such as that shown in FIG. 2, the total distance of travel in the X and Y directions to obtain a full read-out of all patterns recorded, is not the full length or width of the micro-record as in conventional systems, but only a small portion thereof; that is from column $A_c$ to $E_c$ in the X direction, and from rows $A_r$ to $E_r$ in the Y direction. Hence the indexing mechanism can be uncomplicated and yet quite accurate, for the requirements imposed thereon are not at all demanding.

In the one direction indexing record, in the arrangement shown in FIG. 4, the "1's" at the head of the sixth and 12th rows are shown as falling in the same column. However in practice, these may be staggered to accommodate the format of the lens matrix.

While there have been shown and described, preferred embodiments of micro-image recording and read-out system in accordance with the invention, it will be appreciated that many changes and modifications may be made therein without, however, departing from the spirit of the invention. Thus instead of converting each page of text into a character pattern composed of an array of dispersed individual characters or bits, the character pattern may be composed of dispersed groups of characters, or of bites, rather than bits, in which even fewer lensettes are required to project the character pattern.

In the light pipes shown in FIGS. 9 and 10, all surfaces thereof are rendered reflective, as by aluminum coatings, except those areas through which the images are to be illuminated and transmitted.

I claim:

1. A micro-image recording and read-out system for recording in a reduced scale information derived from a plurality of pages or documents to produce a multiple-image microrecord and for selectively reading out the images of said microrecord in an enlarged scale, said system comprising:

A. means to record the characters or bits of information constituting the text of each page or document on a planar recording surface in a manner effecting a dispersion of the characters or bits of information to define a character pattern that is distinct from and interlaced with the character patterns defined by the recordings of the other pages or documents on the same recording surface, thereby to create said multiple-image microrecord; and B. means to read-out said microrecord including a lens matrix disposed in parallel relation to said recording surface and constituted by an array of lensettes which are dispersed on the matrix to assume positions which are optically in axial registration with the characters or bits of information in the particular character pattern on said recording surface which is in alignment with the matrix, whereby the optical axes of the lensettes all lie in parallel relation at right angles to said recording surface, C. means to illuminate the aligned pattern on said recording surface, and D. means to index the recording surface relative to the matrix to selectively align the character patterns on the multi-image micro-record with said array of lensettes to effect projection thereof.

2. A system as set forth in claim 1 wherein the lensettes on said matrix are optically adapted to project the related character or bits of information in a short throw that is not greater than two inches.

3. A system as set forth in claim 2 wherein said throw is less than one inch.

4. A system as set forth in claim 2 wherein each of said lensettes has a relatively narrow angle of field and is uncorrected for aberrations.

5. A system as set forth in claim 2 further including a translucent screen in parallel relation to said matrix to present to a viewer the images projected thereon by said lensettes.

6. A system as set forth in claim 1 wherein said matrix is constituted by a molded plastic panel having an array of convex bosses formed on one surface thereof to define said lensettes.

7. A system as set forth in claim 1 wherein said matrix is constituted by a molded plastic panel having a first array of convex bosses formed on one surface thereof, and a second array of convex bosses formed at corresponding positions on the opposing surface thereof, each pair of corresponding bosses constituting a tandem lensette.

8. A system as set forth in claim 1 wherein said recording surface is transparent and is back-illuminated by said illumination means.

9. A system as set forth in claim 1 wherein said recording surface is opaque and is front-illuminated by said illumination means.

10. A system as set forth in claim 1 wherein said illumination means is constituted by a light conductive pipe having a trunk section for conducting light from a common source to a multiplicity of light conducting branches, each branch leading to a respective character or information bit in the aligned character pattern on said recording surface.

11. A compact optical reader for a multiple image micro-record on which the text of each one of a plurality of pages or documents is recorded in a reduced scale in a manner effecting a dispersion of the characters or bits of information to define a character pattern that is distinct from and interlaced with the character patterns defined by the recordings of the other pages or documents, said reader comprising:

A. means to support said micro-record in a plane;

B. a lens matrix disposed in parallel relation to said micro-record to project a selected character pattern and constituted by an array of lensettes that are dispersed on the matrix to assume positions which are optically in axial registration with the characters or bits of information in the particular character pattern on said micro-record which is aligned with the matrix, whereby the optical axes of the lensettes all lie in parallel relation at right angles to said plane;

C. means to illuminate said micro-record;

D. a screen disposed in parallel relation to said matrix at right angles to said optical axes to present the images of the characters or bits of information projected by said lensettes; and E. means to index the micro-record relative to the matrix to successively align the character patterns therein with said array of lensettes for presentation on said screen.

12. A reader as set forth in claim 11 wherein the lensettes on said matrix are optically adapted to project the related character or bits of information in a short throw that is no greater than two inches, whereby the distance between said screen and said micro-record is short and the reader is in the form of a shallow-box whose depth is substantially equal to said distance.

13. A system as set forth in claim 11, wherein said character patterns are interlaced on the micro-record in the X and Y directions, and said indexing means is adapted to incrementally shift said micro-record relative to said matrix in the X and Y directions to effect a read-out of said patterns.

14. A system as set forth in claim 11, wherein said character patterns are interlaced on the micro-record relative to said matrix in the X direction to effect a read-out of said patterns.

15. A system as set forth in claim 13, wherein said micro-record is in microfiche form.

16. A system as set forth in claim 14, wherein said micro-record is in film strip form.

17. A system as set forth in claim 16, wherein said film strip is supported in a casette and said indexing means serves to advance the film in said casette incrementally.

18. An optical reader for micro-records which comprise a record medium bearing on microscopic scale, a plurality of data sets, said data sets including a plurality of data sub-sets, said sub-sets each comprising at least one data bit, said reader comprising:
A. means to illuminate said micro-record;
B. image-receiving means positioned for read-out of said data sets;
C. lens matrix means separable from said microrecord and configured to project an image of a selected data set to said image receiving means;
D. said lens matrix means comprising a plurality of lens means, each optically confined to a corresponding sub-set of a data set and in axial alignment therewith to project said sub-set to said image-receiving means whereby all of the subsets of a selected data set are simultaneously projected to said image receiving means, the axes of the lens means lying in parallel relation at right angles to said record medium; and
E. means to displace said record medium relative to said lens matrix means to select and project the sub-sets of another data set to said image-receiving means for read-out of same.

19. A reader as defined in claim 18, in which the subsets of one data set are interlaced with the sub-sets of other data sets with the sub-sets of each data set being located relative to each other according to a predetermined pattern, and in which said lens means are situated relative to each other according to said pattern.

20. A reader as defined in claim 19, in which said record medium contains some data sets having their sub-sets interlaced according to one pattern and other data sets having their sub-sets interlaced according to a different pattern and in which said lens matrix means include means to render operative one or the other of two different lens matrices, one matrix having its lens means arranged according to said one pattern and the other matrix having its lens means arranged according to said different pattern.

21. A reader according to claim 19, in which said indexing means include means to provide a total relative movement along one axis which is approximately equal to the product of the magnification of said lens means and the corresponding axial dimension occupied by one sub-set of said micro-record.

22. A reader as defined in claim 19, in which said sub-sets are interlaced along one axis and said indexing means include means for providing corresponding single-axis indexing.

23. A reader as defined in claim 19, in which said sub-sets are interlaced in two coordinate directions and said indexing means include means for producing relative motion along corresponding coordinate axes.

24. A reader as defined in claim 18, in which said matrix includes a plastic sheet having said lens means integrally formed therein.

25. A reader as defined in claim 18, in which said image-receiving means comprise a screen for visual observation of said read-out.

26. A reader as defined in claim 18, in which said illuminating means comprise a light pipe having a plurality of branches for illuminating a selected data set.

27. An optical reader as defined in claim 18, which is particularly adapted for compact configuration in that said lens means are configured to have a projection distance not substantially greater than about 3 inches.

28. An optical reader as defined in claim 18, which is particularly adapted for compact configuration in that the field occupied by a sub-set is in the order of about 2 mils square and wherein said lens means each comprise lenses having a size in the order of about several millimeters and a projection distance in the order of about several inches.

29. Apparatus for changing the size of an image between a microscopic size and a legible size, wherein said image comprises a plurality of data sets, said data sets including a plurality of data sub-sets, and wherein said sub-sets each comprise at least one data bit, comprising:
A. a site for said data in legible size;
B. a medium for storing said data in microscopic size;
C. lens matrix means located between said site and said medium and physically separated from said medium to transfer images therebetween;
D. said lens matrix means comprising a plurality of lens means each optically coupled to a corresponding sub-set of a data set between said site and said medium whereby all of the sub-sets of a selected data set are simultaneously transferred, the axes of said lens means being optically aligned with the plurality of data sub-sets, said axes lying in parallel relation; and
E. means to produce relative displacement between said lens matrix means and said medium for the transfer of other data sets.

* * * * *

UNITED STATES PATENT OFFICE
CERTIFICATE OF CORRECTION

Patent No. 3,704,068  Dated  November 28, 1972

Inventor(s) Adnan Waly

It is certified that error appears in the above-identified patent and that said Letters Patent are hereby corrected as shown below:

Column 2, line 24, "x" should have read -- to -- line 25, "to" at the beginning of the line, should have read
-- x --

Column 12, line 33, "in" should have read -- is --

Column 14, lines 1 and 2 of claim 9, "according"

should have read -- recording --

Signed and sealed this 8th day of May 1973.

(SEAL)
Attest:

EDWARD M. FLETCHER, JR.
Attesting Officer

ROBERT GOTTSCHALK
Commissioner of Patents